United States Patent
Iwasawa (10) Patent No.: US 8,417,518 B2
(45) Date of Patent: Apr. 9, 2013

(54) VOICE RECOGNITION SYSTEM, METHOD, AND PROGRAM

(75) Inventor: Toru Iwasawa, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/528,767

(22) PCT Filed: Feb. 27, 2008

(86) PCT No.: PCT/JP2008/053368
§ 371 (c)(1), (2), (4) Date: Aug. 26, 2009

(87) PCT Pub. No.: WO2008/108239
PCT Pub. Date: Sep. 12, 2008

(65) Prior Publication Data
US 2010/0106495 A1    Apr. 29, 2010

(30) Foreign Application Priority Data
Feb. 27, 2007    (JP) ................ 2007-047217

(51) Int. Cl.
G10L 19/14    (2006.01)

(52) U.S. Cl. ........ 704/225; 704/268; 704/237; 704/233; 704/231; 704/228; 704/226; 704/221; 704/211; 704/205; 381/1; 379/67.1; 379/388.04; 379/202.01; 379/114.14; 84/616

(58) Field of Classification Search ........ 704/268, 704/231, 226, 237, 233, 228, 221, 211, 205; 381/1; 379/67.1, 388.04, 202.01, 114.14; 84/616
See application file for complete search history.

(56) References Cited

U.S. PATENT DOCUMENTS

| | | | | |
|---|---|---|---|---|
| 4,672,669 A | * | 6/1987 | DesBlache et al. | 704/237 |
| 5,210,366 A | * | 5/1993 | Sykes, Jr. | 84/616 |
| 5,448,624 A | * | 9/1995 | Hardy et al. | 379/67.1 |
| 5,572,591 A | * | 11/1996 | Numazu et al. | 381/1 |
| 5,867,574 A | * | 2/1999 | Eryilmaz | 379/388.04 |
| 5,991,718 A | * | 11/1999 | Malah | 704/233 |
| 6,205,420 B1 | * | 3/2001 | Takagi et al. | 704/211 |
| 6,256,606 B1 | * | 7/2001 | Thyssen et al. | 704/221 |
| 6,539,355 B1 | * | 3/2003 | Omori et al. | 704/268 |
| 6,862,567 B1 | * | 3/2005 | Gao | 704/228 |
| 2004/0030544 A1 | * | 2/2004 | Ramabadran | 704/205 |
| 2004/0172244 A1 | * | 9/2004 | Oh et al. | 704/231 |
| 2005/0143988 A1 | | 6/2005 | Endo et al. | |

(Continued)

FOREIGN PATENT DOCUMENTS

| | | |
|---|---|---|
| JP | 05-249987 A | 9/1993 |
| JP | 07-312795 A | 11/1995 |
| JP | 10-288994 A | 10/1998 |
| JP | 2004-271736 A | 9/2004 |

(Continued)

*Primary Examiner* — Michael Colucci
(74) *Attorney, Agent, or Firm* — Sughrue Mion, PLLC (57) ABSTRACT

A voice recognition system comprises: a voice input unit that receives an input signal from a voice input element and output it; a voice detection unit that detects an utterance segment in the input signal; a voice recognition unit that performs voice recognition for the utterance segment; and a control unit that outputs a control signal to at least one of the voice input unit and the voice detection unit and suppresses a detection frequency if the detection frequency satisfies a predetermined condition.

20 Claims, 7 Drawing Sheets

U.S. PATENT DOCUMENTS

| | | |
|---|---|---|
| 2005/0177362 A1 | 8/2005 | Toguri |
| 2005/0185779 A1* | 8/2005 | Toms .................. 379/114.14 |
| 2006/0106601 A1* | 5/2006 | Kong et al. ................ 704/226 |
| 2006/0161430 A1* | 7/2006 | Schweng ................ 704/233 |
| 2007/0021958 A1* | 1/2007 | Visser et al. ................ 704/226 |
| 2008/0144794 A1* | 6/2008 | Gardner .................. 379/202.01 |

FOREIGN PATENT DOCUMENTS

| | | |
|---|---|---|
| JP | 2005-165021 A | 6/2005 |
| JP | 2005-242182 A | 9/2005 |
| JP | 2006-038894 A | 2/2006 |
| JP | 2006-039447 A | 2/2006 |

* cited by examiner

| CONDITION OF TOO FREQUENT VOICE DETECTION | THE NUMBER OF VOICE DETECTION IS NOT LESS THAN TEN TIMES WITHIN THE LAST ONE MINUTE |
|---|---|
| OPERATIONAL SOUND CONTROL | FUNCTION OF A HUMAN DETECTION SENSOR IS TERMINATED |
| VOICE DETECTION SUPPRESSION CONTROL | PROCESS OF INTRODUCING A WHITE NOISE |
| TERMINATION CONDITION | LAPSE OF FIVE MINUTES |

VOICE RECOGNITION SYSTEM, METHOD, AND PROGRAM

TECHNICAL FIELD

Description of Related Application

The present invention is based upon and claims the benefit of the priority of Japanese patent application No. 2007-047217, filed on Feb. 27, 2007, the disclosure of which is incorporated herein in its entirety by reference thereto.

The present invention relates to a voice recognition system, method, and program, and more specifically to a voice recognition system, method, and program that are realized in an embedded system and other systems with a limited memory and computational resources.

BACKGROUND ART

When voice recognition is performed in an embedded system, there arises a problem of how to perform voice recognition based on limited resources (CPU, memory and others). Voice recognition is generally performed in a sequential flow where an input signal from a voice input element is A/D converted, the data thus obtained is stored in a buffer, data appropriately delivered from the buffer is processed by a recognition engine, and the recognition result is output. In a process by the recognition engine, first, a voice detection process is performed, then a heavy-load recognition process (voice recognition process) is performed only for a segment which is determined to include a voice in the input signal.

When the resource is insufficient to handle the load of the recognition process, it cannot process voice data delivered from the buffer and processing delay for the delivered data occurs. As a result, time required for recognition is markedly prolonged. Furthermore, following a delay in the recognition, there also arises a problem that the buffer overflows due to a delay in delivering data from the data buffer to the engine. When there is a heavy load process other than a voice recognition process operating simultaneously with the voice recognition process, there also arises a problem that these processes delay the voice recognition process.

When the load of the voice recognition causes a processing delay, the degree of its influence varies according to frequency of voice detection. If the frequency of voice detection is small (low), the processing delay can be recovered during the off period of the recognition process; however, if the frequency is large (high), the processing delay accumulates.

A general voice recognition engine detects a beginning edge of an utterance based on whether a feature value such as power of or S/N ratio of the input voice exceeds a threshold or not and starts voice detection. Then, it detects a trailing edge at the time when the above described feature value is less than a threshold value for a given period of time. These methods of voice detection have a feature that a voice is scarcely detected when used in a quiet (low noise) environment. However, there occurs a problem that frequency of voice detection becomes high in an environment where surrounding noise or operational sound of a system itself is intermittently introduced into an input signal.

A method of adjusting a threshold for voice detection according to a noise level, as a means for accurately detecting an utterance segment, is described in Patent Document 1. A method of extracting and detecting a segment that appears to be an utterance segment, by matching against the standard model of vowel when a voice is detected, is described in Patent Document 2.

Patent Document 1

JP Patent Kokai Publication No. JP-P2005-242182A

Patent Document 2

JP Patent Kokai Publication No. JP-A-5-249987

SUMMARY

The disclosure of Patent Documents 1 and 2 in the above is incorporated herein by reference thereto. The following analysis of the related art is given by the present invention.

The prior art of dynamically changing a threshold for a voice detection segment in Patent Document 1, is effective in an environment where a noise level is stable such as in a running car, However, there is a problem that voice detection becomes difficult in an environment where noise level varies.

An object of technique in Patent Document 2 is to correctly detect an utterance segment by separating the segment and noise segment. Therefore, a voice recognition engine can perform voice detection easily in an environment where noise including a human voice from the surrounding conversation is continuously introduced into an input signal. However, since a voice recognition process operates continuously in such an environment, there arises a problem that a voice input buffer overflows due to delay in recognition process caused by an insufficient resource and recognition processing time increases; and there also arises a problem that error operation is likely to be caused by recognizing an unnecessary voice as a recognized word.

Therefore, it is an object of the present invention to provide a voice recognition system, method and program that prevent increase in processing load in voice recognition and prevent error operation caused by a fault voice recognition, even when surrounding noise or an operational sound of a system itself is introduced into an input signal.

According to a first aspect of the present invention, there is provided a voice recognition system comprising:

a voice input unit that receives an input signal from a voice input element and output it;

a voice detection unit that detects an utterance segment in the input signal;

a voice recognition unit that performs voice recognition for the utterance segment; and a control unit that outputs a control signal to at least one of the voice input unit and the voice detection unit and suppresses a detection frequency if the detection frequency satisfies a predetermined condition.

In the above voice recognition system, the voice detection unit may adjust its operation parameter so as to decrease the detection frequency if it receives the control signal.

In the above voice recognition system, the voice input unit may reduce gain of the input signal if it receives the control signal.

In the above voice recognition system, the voice detection unit may superpose noise on the input signal if it receives the control signal. The noise is preferably white noise.

According to a second aspect of the present invention, there is provided a voice recognition system including a device that generates an operational sound; the voice recognition system comprising:

a voice input unit that receives an input signal from a voice input element and outputs it;

a voice detection unit that detects an utterance segment in the input signal;

a voice recognition unit that performs voice recognition of the utterance segment;

a control unit that outputs a control signal to the device so as to suppress the operational sound if a detection frequency in the voice detection unit satisfies a predetermined condition; and an operational sound control unit that controls the operational sound of the device if it receives the control signal.

In the above voice recognition system, the control unit may output a control signal to at least one of the voice input unit and the voice detection unit and suppress a detection frequency in the voice detection unit if the detection frequency satisfies a predetermined condition.

There is provided a robot comprising the above voice recognition system; the robot speaks and moves according to a voice recognition result output from the voice recognition unit.

According to a third aspect of the present invention, there is provided a voice recognition method comprising:

receiving an input signal from a voice input element and outputting it;

voice-detecting an utterance segment in the input signal;

performing voice recognition for the utterance segment; and outputting a result of the voice recognition;

wherein the method comprises suppressing a detection frequency in the voice-detecting if the detection frequency satisfies a predetermined condition.

In the above voice recognition method, the method comprises adjusting an operation parameter so as to decrease a voice detection frequency if the detection frequency in the voice-detecting satisfies a predetermined condition.

In the above voice recognition method, the method comprises adjusting an operation parameter so as to decrease a gain of the input signal if the detection frequency in the voice-detecting satisfies a predetermined condition.

In the above voice recognition method, the method comprises superposing noise on the input signal if a detection frequency in the voice-detecting satisfies a predetermined condition.

According to a fourth aspect of the present invention, there is provided a voice recognition method in a voice recognition system including a device that generates an operational sound; the voice recognition method comprising:

receiving an input signal from a voice input element and outputting it;

voice-detecting an utterance segment in the input signal;

performing voice recognition for the utterance segment; and outputting a result of the voice recognition;

wherein the method comprises an operation sound superposing of outputting to the device a control signal to suppress the operational sound and superposing the operational sound if a detection frequency in the voice-detecting satisfies a predetermined condition.

In the above voice recognition method, the method comprises suppressing a detection frequency in the voice-detecting if the detection frequency satisfies a predetermined condition.

According to a fifth aspect of the present invention, there is provided a voice recognition program that causes a computer to execute:

receiving an input signal from a voice input element and outputting it;

voice-detecting an utterance segment in the input signal;

performing voice recognition for the utterance segment; and outputting a result of the voice recognition;

wherein the program comprises suppressing a detection frequency in the detecting, if the detection frequency in the voice-detecting satisfies a predetermined condition.

In the above voice recognition program, a computer is caused to execute adjusting an operation parameter so as to decrease a voice detection frequency if the detection frequency in the voice-detecting satisfies a predetermined condition.

In the above voice recognition program, a computer is caused to execute reducing gain of the input signal if a detection frequency in the voice-detecting satisfies a predetermined condition.

In the above voice recognition program, a computer is caused to execute superposing noise on the input signal if a detection frequency in the voice-detecting satisfies a predetermined condition.

According to a sixth aspect of the present invention, there is provided a voice recognition program in a voice recognition system including a device that generates operational sound; the voice recognition program causing a computer to execute:

receiving an input signal from a voice input element and outputting it;

voice-detecting an utterance segment in the input signal;

performing voice recognition for the utterance segment; and outputting a result of the voice recognition;

wherein the program causes the computer to execute an operation sound control outputting to the device a control signal to suppress the operational sound and controlling the operational sound if a voice detection frequency in the voice-detecting satisfies a predetermined condition.

In the above voice recognition program, the computer is caused to execute suppressing a detection frequency if the detection frequency in the voice-detecting satisfies a predetermined condition.

According to a voice recognition system, method and program of the present invention, operation without a failure that is caused by too frequent voice detection at voice recognition is possible when surrounding noise from TV or conversation continuously occurs.

The reason is that an unnecessary recognition process is prevented by suppressing unnecessary voice detection.

According to a voice recognition system, method, and program of the present invention, incorrect operation of the system at voice recognition can be avoided when a continuous surrounding noise from TV or conversation is occurring.

The reason is that execution of operation that is caused by recognizing an unnecessary voice as a recognized word and responding to the recognized word can be avoided by suppressing unnecessary voice detection.

EXPLANATIONS OF REFERENCE SYMBOLS 1 voice input unit
2 voice detection unit
3 voice recognition unit
4 control unit
5 operational sound control unit
10 movable unit
20 human detection sensor
30 voice input microphone

PREFERRED MODES

First Exemplary Embodiment

A voice recognition system according to a first exemplary embodiment of the present invention is described in detail with reference to the drawings.

Figure 1:
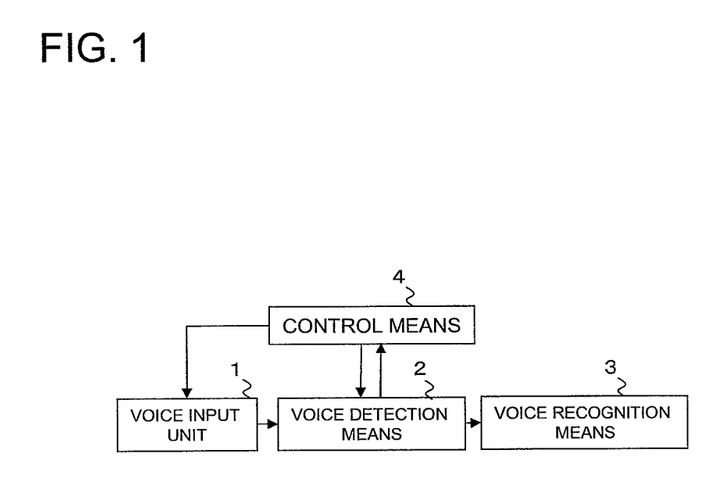
FIG. 1 is block diagram showing a structure of a voice recognition system according to a first exemplary embodiment of the present invention.

With reference to FIG. 1, a voice recognition system according to a first exemplary embodiment of the present invention comprises: a voice input unit 1 that receives an input signal from a voice input element and output it; a voice detection unit 2 that detects an utterance segment in the input signal; a voice recognition unit 3 that performs voice recognition for the utterance segment; and a control unit 4 that outputs a control signal to at least one of the voice input unit 1 and the voice detection unit 2 if a detection frequency in the voice detection unit 2 satisfies a predetermined condition.

The control unit 4 adjusts the voice detection according to the detection frequency in the voice detection unit 2.

As a concrete process, the control unit 4 performs a voice detection suppression control to suppress the voice detection if voice detection is determined to be too frequent.

Figure 4:
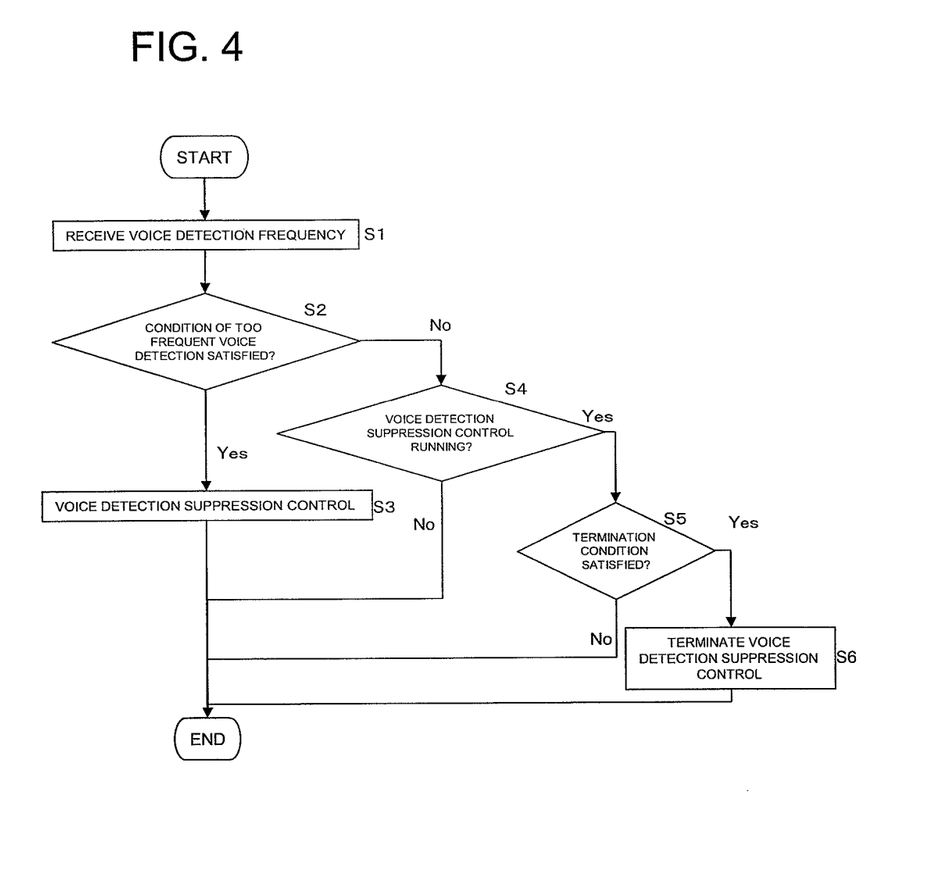
FIG. 4 is a flowchart showing an operation of a preferred mode for carrying out a first embodiment of the preset invention.

An example of an operation of the control unit 4 is explained in detail with reference to a flowchart of FIG. 4.

The control unit 4 receives information on a voice detection frequency from the voice detection unit 2 (Step S1). Data received as the voice detection frequency includes a frequency, an occupation time and the like. For example, data such as a number of voice detections within a given period of time (frequency) and/or an occupation rate of operation time of the voice recognition process (occupation time) are/is acquired as the voice detection frequency.

If a detection frequency satisfies a predetermined condition of too frequent voice detection (a condition that the number of voice detection exceeds a threshold value, a condition that the occupation rate of operation time exceeds a threshold value, and other conditions) (Step S2), the control unit 4 performs a voice detection suppression control on at least one of the voice input unit 1 and the voice detection unit 2 in order to suppress the voice detection (Step S3).

If it is determined that the condition of too frequent voice detection is not satisfied (Step S2), determination is made on whether a voice detection suppression control is running or not (Step S4). If a voice detection suppression control is running, determination is made on whether a termination condition is satisfied or not (Step S5). If it is determined that the condition is satisfied (Step S5; Yes), the voice detection suppression control (Step S6) is terminated. As the termination condition, for example, a condition that a given time has lapsed after a voice detection suppression control has been performed and the voice detection frequency does not satisfies a predetermined condition can be employed.

The control unit 4 executes the process illustrated in the above flowchart (FIG. 4) repeatedly at an appropriate interval.

As an example of a voice detection suppression control performed by the voice input unit 1, there is a method of adjusting the input gain. If decision of voice detection is performed based on an absolute value of the input signal power, a frequency of voice detection can be decreased by lowering the input gain.

As a voice detection suppression control performed by the voice detection unit 2, for example, there are a method of changing a threshold value for a power or an S/N ratio to determine whether a voice is detected and method of superposing a noise on the input signal.

If the voice detection is conducted based on an S/N ratio of an input signal, there is provided an effect that an input signal is smoothed and the S/N ratio is lowered by superposing a noise and the frequency of voice detection is decreased. As a noise to be superposed, it is desirable, for example, to use a white noise whose power is uniform over frequency. A method of introducing a white noise whitens the surrounding noise for the input signal during the voice detection and increases the accuracy of the voice recognition if an utterance voice and a surrounding noise are mixed in the input signal (provided that an input signal level for the utterance voice is greater than an input signal level for the surrounding noise).

As explained in the above, when there is a problem of too frequent voice detection, the voice detection suppression control solve the problem.

Second Exemplary Embodiment

A second exemplary embodiment of the present invention is described in detail with reference to the drawings.

Figure 2:
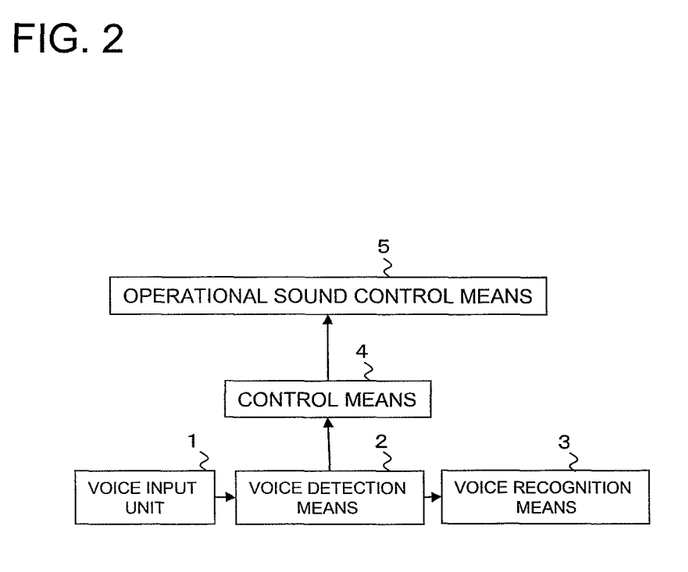
FIG. 2 is a block diagram showing a structure of a voice recognition system according to a second exemplary embodiment of the present invention.

With reference to FIG. 2, the second exemplary embodiment of the present invention is a system including a device (not shown in the drawings) that generates an operational sound; the voice recognition system comprising: a voice input unit 1 that receives an input signal from a voice input element and outputs it; a voice detection unit 2 that detects an utterance segment in the input signal; a voice recognition unit 3 that performs voice recognition on the utterance segment; a control unit that outputs a control signal to the device to suppress the operational sound if a detection frequency in the voice detection unit 2 satisfies a predetermined condition; and an operational sound control unit 5 that controls the operational sound of the device if it receives the control signal output by the control unit 4.

In the second exemplary embodiment, operational sound control is performed under assumption that an excessively high frequency of voice detection is caused by an operational sound generated by itself.

The control unit 4 outputs a control signal to the operational sound control unit 5 to suppress an operational sound, if it determines that the voice detection is too frequent.

The operational sound control unit 5 controls an operational sound generated by the system itself, when it receives the control signal. If the system is, for example, a robot, the operational sound control unit 5 performs an operational sound control over a mechanical noise generated by a motor or a gear or a device such as a speaker that belongs to the robot.

The operational sound control unit 5, by monitoring at all times a device that generates an operational sound, controls the environment where an operational sound is present and controls the device to suppress the operational sound according to the situation of the operational sound when the control signal is received.

The first and second exemplary embodiments explained in the above may employ a structure wherein a voice detection suppression control unit 4 and an operational sound control unit 5 are integrated.

Figure 3:
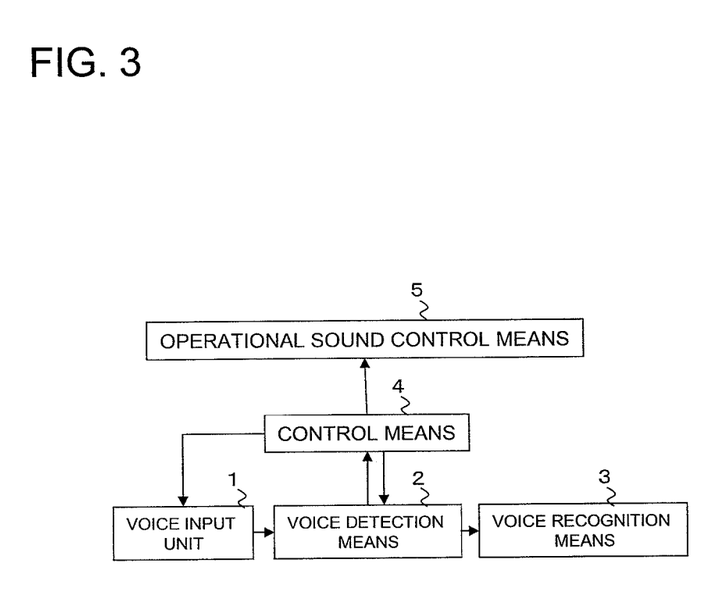
FIG. 3 is a block diagram showing an integrated structure of a first exemplary embodiment and a second exemplary embodiment of the present invention.

FIG. 3 is a block diagram showing a structure wherein the first exemplary embodiment and the second exemplary embodiment are integrated.

A control unit 4 in this structure outputs a control signal to an operational sound control unit 5 and at least one of a voice input unit 1 and a voice detection unit 2.

Even when an operational sound generated by itself and a surrounding noise coexist as a source of too frequent voice detection, an integrated structure like this copes with a problem according to its location, for example, by suppressing noise generation if the source is a noise (operational sound) made by itself, and by performing a voice detection suppression control if the source is the surrounding noise.

Figure 5:
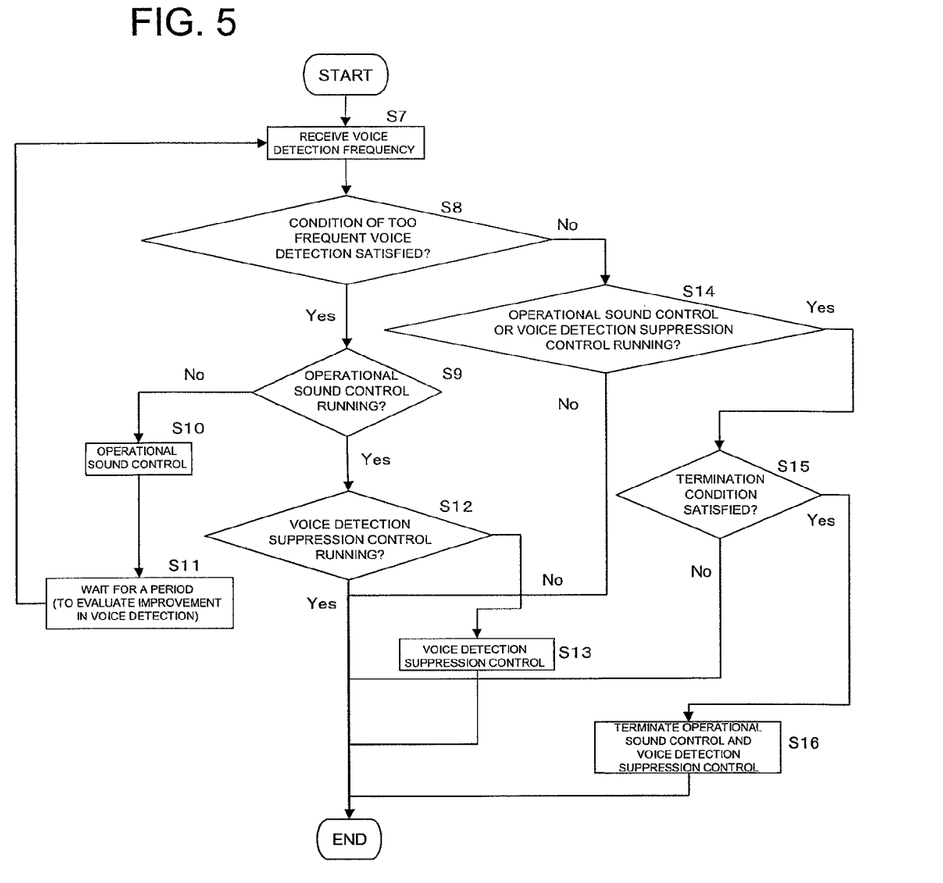
FIG. 5 is a flowchart showing an operation of an integrated structure of a first exemplary embodiment and a second exemplary embodiment of the present invention.

With reference to the flowchart shown in FIG. 5, an example of an operation method of the control unit 4 in the above integrated structure (FIG. 3) is explained in detail.

In this example, when the system detects too frequent voice detection, it first performs a control to suppress an operational sound of itself, it then performs a voice detection suppression control if a situation of too frequent voice detection is not improved by the suppression of the operational sound of itself.

First the control unit 4 receives a voice detection frequency (Step S7) and determines whether the voice detection frequency satisfies a predetermined condition of too frequent voice detection (Step S8).

If it is determined that the condition of too frequent voice detection is satisfied (Step S8; Yes), the control unit 4 determines whether an operational sound control is running or not (Step S9). If it determines that the operational sound control is not running (Step S9; No), it sends a control signal to the operational sound control unit 5 and performs an operational sound control (Step S10).

Wait for a certain period of time (Step S11) to evaluate an effect of suppressing (improving) the voice detection frequency, receive again a voice detection frequency (Step S7), and determine whether voice detection is too frequent or not (Step S8).

If it is determined that the voice detection is too frequent (Step S8; Yes), it is also determined that an operational sound control is running (Step S9; Yes). Then, determine whether a voice detection suppression control is running or not (Step S12) and performs a voice detection suppression control over at least one of the voice input unit 1 and voice detection unit 2 (Step S13) if the voice detection suppression control is not running (Step S12; No).

If too frequent voice detection is suppressed and it is determined that a condition of too frequent voice detection is not satisfied (Step S8; No), determine whether an operational sound control or an operational sound detection suppression control is running (Step S14). If it is determined that the operational sound control or the operational sound detection suppression control is running (Step S14; Yes), determine whether a termination condition is satisfied or not (Step S15). If the termination condition is satisfied (Step S15; Yes), the operational sound control and the operational sound suppression control are terminated (Step S16).

Example

A voice recognition system according to the present invention is described based on a concrete example.

Figure 6:
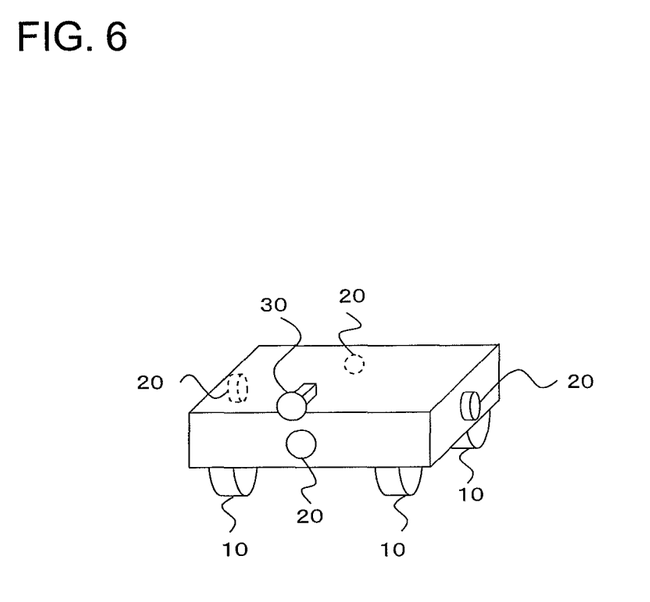
FIG. 6 is a configuration diagram of a voice recognition system (a mobile robot) according to an example of the present invention.

The present example is a simple example of a mobile robot that comprises a mobile unit such as a wheel shown in FIG. 6, human detection sensors (infrared sensor and others) 20, and voice input microphone 30 for voice recognition.

The human detection sensor 20 has forward directivity and arranged at four directions of front, rear, left and right. Based on a response of the human detection sensor 20, it is determined whether a human is detected in any of directions of front, rear, left and right.

Based on this function, when a human detection sensor 20 makes a response during the conversation, the mobile robot performs a rotation using the movable unit 10 and directs the voice input microphone 30 to the direction of the human detection sensor 20 that made the response.

For example, when the voice input microphone 30 is arranged at the front side and a human detection sensor arranged at the rear side makes a response, the robot rotates 180 degrees horizontally.

This rotation is accompanied by a noise such as motor sound. In this mobile robot, there are for example following two situations where voice detection is determined to be too frequent due to the influence of noise.

The first situation is a situation where a voice detection occurs frequently because of an operational sound made by an rotational movement of the movable unit 10 caused by a detection or a wrong detection of many surrounding people by the human detection sensor 20. The second situation is a situation where voice detection occurs frequently because of an actual surrounding noise.

When too frequent voice detection is caused by either one or both of these situations, an action based on operational sound control and voice detection suppression control is effective.

Termination of function of the human detection sensor 20 performed as operational sound control relates to an operational sound control method based on suppression of a rotation of a robot when it detects a human and suppression of an operational sound of the robot by avoiding detection of a human.

Figure 7:
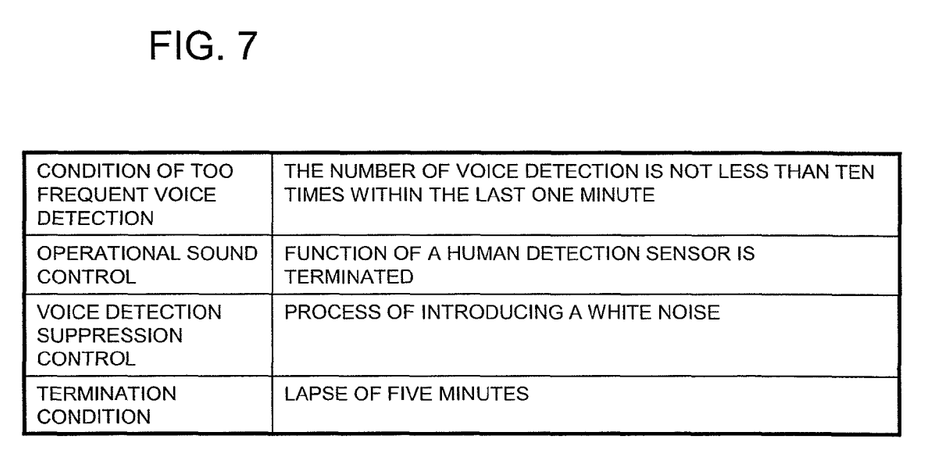
FIG. 7 is a diagram showing a control condition of a voice recognition system (a mobile robot) according to an example of the present invention.

This robot can be operated, as an example, according to a condition shown in FIG. 7. When the number of voice detections is not less than 10 times within the last one minute, it is determined that voice detection is too frequent, function of the human detection sensor 20 is stopped as an operational sound control, and superposition of a white noise is performed as a voice detection suppression control, and the process is terminated if it is determined that a voice detection is not too frequent when five minutes has passed since the last execution.

An operation according to the present example is explained with reference to the above flowchart in FIG. 5.

Receive the number of voice detections within a last one minute (Step S7), and determine whether the number of detections is not less than 10 or not (Step S8).

If it is determined that the number of detection is not less than 10 times (Step S8; Yes), then determine whether an operational sound control is running or not (Step S9). If it is not running (Step S9; No), perform an operational sound control to stop the human detection sensor 20 (Step S10).

Then, wait for a minute to evaluate an effect of suppressing the voice detection frequency (Step S11), receive again the number of voice detections within the last minute (Step S7), and determine whether the number of voice detections is not less than 10 times or not (Step S8).

If it is determined that the number of voice detections is not less than 10 times (Step S8; Yes), it is also determined that an operational sound control is running (Step S9; Yes). Then, determine whether superposition of a white noise as a voice detection suppression control is running or not (Step S12) and superpose a white noise (Step S13) if it is not running (Step S12; No).

If the number of voice detection within the last minutes is less than 10 times, and a voice detection is determined to be not too frequent (Step S8; No), and an operational sound control or a voice detection suppression control is running (Step S14; Yes), determine whether a termination condition that a five minute has passed since the execution of the latter of them is satisfied or not (Step S15). If it is determined that the termination condition is satisfied (Step S15; Yes), operate the human detection sensor 20 again and terminate the superposition of a white noise (Step S16).

INDUSTRIAL APPLICABILITY

The present invention is applicable to real environment oriented voice recognition in an embedded system or other systems with limited memory and computational resources. It is applicable, for example, to a small game machine, a cellular phone, a personal digital assistant (PDA), and a small robot that uses a voice conversation. Within the scope of the entire disclosure (including the claims) of the present invention, and based further on the basic technological idea, the preferred modes can be changed and adjusted. Moreover, various combination or selection from the various disclosed elements is possible within the scope of the claims of the present invention.

The invention claimed is:

1. A voice recognition system comprising:
   a voice input unit that receives an input signal from a voice input element and outputs the input signal;
   a voice detection unit that detects an utterance segment in the input signal;
   a voice recognition unit that performs voice recognition for the utterance segment; and
   a control unit that outputs a control signal to at least one of the voice input unit and the voice detection unit and suppresses a frequency of occurrence of detection by the voice detection unit if the frequency satisfies a predetermined condition.

2. The voice recognition system of claim 1, wherein the voice detection unit adjusts its operation parameter so as to decrease the frequency if the voice detection unit receives the control signal.

3. The voice recognition system of claim 1, wherein the voice input unit reduces gain of the input signal if the voice input unit receives the control signal.

4. The voice recognition system of claim 1, wherein the voice detection unit superposes noise on the input signal if the voice detection unit receives the control signal.

5. The voice recognition system of claim 4, wherein the noise is white noise.

6. A voice recognition system including a device that generates operational sound, the voice recognition system comprising:
   a voice input unit that receives an input signal from a voice input element and outputs the input signal;
   a voice detection unit that detects an utterance segment in the input signal;
   a voice recognition unit that performs voice recognition for the utterance segment;
   a control unit that outputs a control signal to the device so as to suppress the operational sound if a frequency of occurrence of detection by the voice detection unit satisfies a predetermined condition; and
   an operational sound control unit that controls the operational sound of the device if the operational sound control unit receives the control signal.

7. The voice recognition system of claim 6, wherein the control unit outputs a control signal to at least one of the voice input unit and the voice detection unit and suppresses the frequency in the voice detection unit if the frequency satisfies a predetermined condition.

8. A robot comprising the voice recognition system of claim 7, wherein the robot speaks and moves according to a voice recognition result output from the voice recognition unit.

9. A voice recognition method comprising:
   receiving an input signal from a voice input element and outputting the input signal;
   voice detecting an utterance segment in the input signal;
   performing voice recognition for the utterance segment; and
   outputting a result of the voice recognition,
   wherein the method further comprises suppressing a frequency of occurrence of detection in the voice-detecting if the frequency satisfies a predetermined condition.

10. The voice recognition method of claim 9, further comprising adjusting an operation parameter so as to decrease the frequency if the frequency in the voice-detecting satisfies a predetermined condition.

11. The voice recognition method of claim 9, further comprising reducing gain of the input signal if the frequency in the voice-detecting satisfies a predetermined condition.

12. The voice recognition method of claim 9, further comprising superposing noise on the input signal if the frequency in the voice-detecting satisfies a predetermined condition.

13. A voice recognition method in a voice recognition system including a device that generates operational sound, the voice recognition method comprising:
   receiving an input signal from a voice input element and outputting the input signal;
   voice detecting an utterance segment in the input signal;
   performing voice recognition for the utterance segment; and
   outputting a result of the voice recognition,
   wherein the method further comprises an operational sound suppressing comprising outputting to the device a control signal to suppress the operational sound and suppressing the operational sound if a frequency of occurrence of detection in the voice-detecting satisfies a predetermined condition.

14. The voice recognition method of claim 13, further comprising suppressing the frequency if the frequency in the voice-detecting satisfies a predetermined condition.

15. A voice recognition program that causes a computer to execute:
   receiving an input signal from a voice input element and outputting the input signal;
   voice detecting an utterance segment in the input signal;
   performing voice recognition for the utterance segment; and
   outputting a result of the voice recognition;
   wherein the program further causes the computer to execute suppressing a frequency of occurrence of detection the voice-detecting, if the frequency satisfies a predetermined condition.

16. The voice recognition program of claim 15, wherein the program further causes a computer to execute adjusting an operation parameter to decrease the frequency in the voice detecting if the frequency satisfies a predetermined condition.

17. The voice recognition program of claim 15, wherein the program further causes a computer to execute reducing gain of the input signal if the frequency in the voice-detecting satisfies a predetermined condition.

18. The voice recognition program of claim 15, wherein the program further causes a computer to execute superposing noise on the input signal if the frequency in the voice-detecting satisfies a predetermined condition.

19. A voice recognition program in a voice recognition system including a device that generates operational sound, the voice recognition program causing a computer to execute:
   receiving an input signal from a voice input element and outputting the input signal;
   voice detecting an utterance segment in the input signal;
   performing voice recognition of the utterance segment; and
   outputting a result of the voice recognition;
   wherein the program further causes the computer to execute an operational sound-control of outputting to the device a control signal to suppress the operational sound and controlling the operational sound if a frequency of occurrence of detection in the voice detecting satisfies a predetermined condition.

20. The voice recognition program of claim 19, wherein the program further causes the computer to execute suppressing the frequency if the frequency in the voice-detecting satisfies a predetermined condition.

\* \* \* \* \*

UNITED STATES PATENT AND TRADEMARK OFFICE
CERTIFICATE OF CORRECTION

Page 1 of 2

PATENT NO. : 8,417,518 B2
APPLICATION NO. : 12/528767
DATED : April 9, 2013
INVENTOR(S) : Toru Iwasawa It is certified that error appears in the above-identified patent and that said Letters Patent is hereby corrected as shown below:

In the Drawings

Drawing Sheet 1 of 7, Fig 1: delete drawing in its entirety and insert

FIG. 1

Drawing Sheet 2 of 7, Fig. 2: delete drawing in its entirety and insert

FIG. 2

Signed and Sealed this
Twenty-seventh Day of January, 2015

Michelle K. Lee
*Deputy Director of the United States Patent and Trademark Office*

Drawing Sheet 3 of 7, Fig. 3: delete drawing in its entirety and insert

FIG. 3

In the Claims

Column 11, Line 11: In Claim 15, delete "recognition;" and insert -- recognition, --

Column 11, Line 14: In Claim 15, delete "the" and insert -- in the --

Column 12, Line 11: In Claim 19, delete "recognition;" and insert -- recognition, --